Nov. 14, 1950     D. P. ECKMAN     2,530,157
ELECTRIC PROPORTIONING CONTROLLER
WITH LIQUID-OPERATED FOLLOW-UP
Filed March 31, 1948

*INVENTOR.*
DONALD P. ECKMAN
BY Arthur H. Swanson
ATTORNEY.

Patented Nov. 14, 1950

2,530,157

UNITED STATES PATENT OFFICE 2,530,157

ELECTRIC PROPORTIONING CONTROLLER WITH LIQUID-OPERATED FOLLOW-UP

Donald P. Eckman, Ithaca, N. Y., assignor, by mesne assignments, to Minneapolis-Honeywell Regulator Company, Minneapolis, Minn., a corporation of Delaware Application March 31, 1948, Serial No. 18,144

8 Claims. (Cl. 318—31)

This invention relates to a controller for positioning a final control element, such as an electric-motor-operated valve, in response to movements of a measuring element, such as a thermometer, pressure gauge, or like meter for measuring liquid-level, hydrogen ion concentration, stroke, or other variable quantity or quality of electricity, magnetism, chemistry or mechanics.

Among the objects of this invention is the provision of a controller having an electrically operated proportional control system, which operates the final control element in response to movements of the measuring element, and having a fluid-filled system providing a follow-up, whereby the position of the final control element closely follows the variations of the measuring instrument.

Another object of this invention is to afford such an automatic controller embodying a fluid-operated reset mechanism for compensating for variations in the characteristics of the quantity being controlled or of the controlling quantity. The fluid operated follow-up and reset mechanism provides such an automatic reset mode of operation very simply and accurately.

An additional object of this invention is to furnish a system for controlling an industrial process which combines the advantages of an electrically operated controller and a controller operated by a fluid (particularly a liquid).

Still another object of this invention is to secure these advantages of electrical and fluid operation in factories or other places in which there is no separate source of fluid pressure. This is possible with the device of the present invention because the electrical system, which has plenty of power, drives the fluid-operated system and furnishes the source of motive power for it.

It is a further object to provide such a follow-up system in which the final control element is accurately positioned without the use of slide wires, "Selsyns," or other positioning devices.

It is desirable that measuring elements be as sensitive and responsive as possible to the quality or quantity measured. Accordingly such measuring elements have no power of any consequence available for indication or control operations. By the provision of an electric proportional control system, the device of this invention is able to respond to very minute movements of the measuring element, to be adjustable, to be actuated instantly by the measuring element at any selected point in the range of movement of the measuring element, and to have plenty of power available to move a final control element or an electric motor operating such final control element. All this is accomplished without imposing any appreciable load upon the measuring element and without interfering in any way with the freedom of movement of the measuring element. In order that the final control element shall follow the movements of the measuring element as closely as possible, a follow-up system having an automatic reset mode of operation is provided. This automatic reset operation can be accomplished by an electrical device but it is more easily and accurately achieved by a closed system filled with a fluid, such as oil. The device of this invention, which employs an electrically operated system for actuating the final control element proportionately to the movements of the measuring and which employs a fluid-operated system for resetting the final control element in response to the movements of the measuring element, represents the simplest, most sensitive and accurate controller available.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

Figure 1:
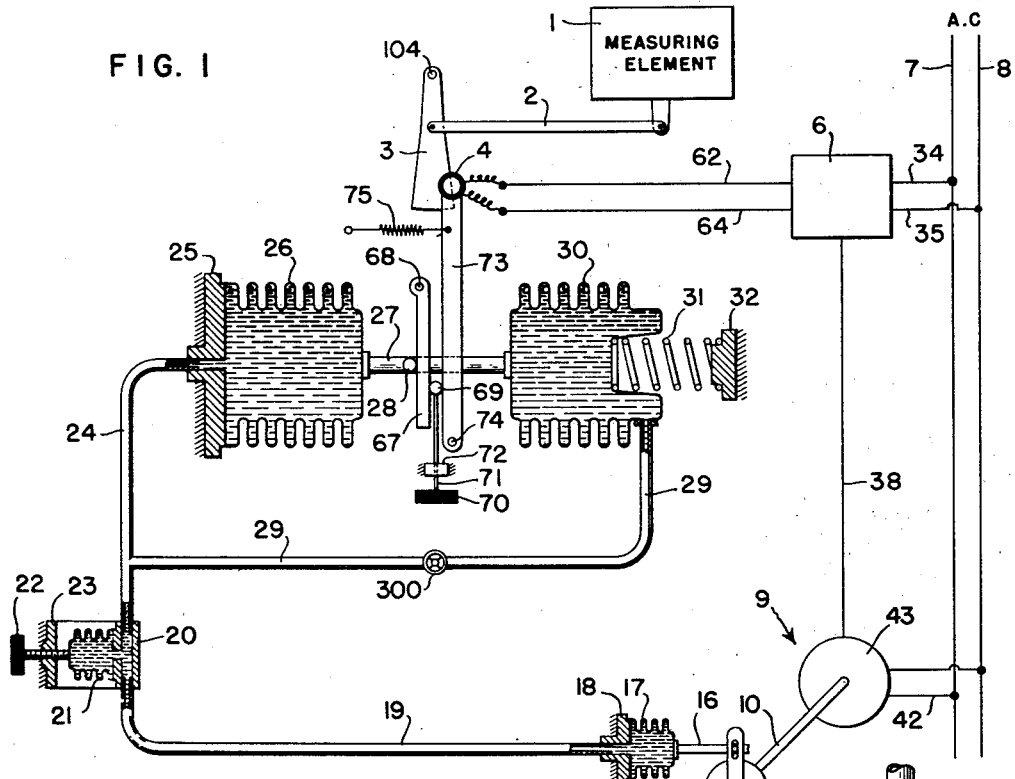
Fig. 1 is a diagrammatic or schematic showing with parts cut away in longitudinal cross section.

The embodiment of this invention illustrated in the drawings and described in the specification includes a measuring element 1, such as a bi-metallic thermometer, but which can readily be another meter for measuring another variable quantity or quality. The meter 1 is connected by a pivotally mounted link 2 with a shielding vane 3 which may be a thin sheet of conducting metal, such as aluminum, reinforced by stiffening ribs, if desired. Vane 3 is pivoted about a stationary post 104 so that the vane 3 normally is located either between the coils 4 and 5 which are spaced apart sufficiently to receive vane 3 between them or away from the coils 4 and 5. Coil 5 is behind coil 4 and therefore is invisible in Fig. 1.

Figure 2:
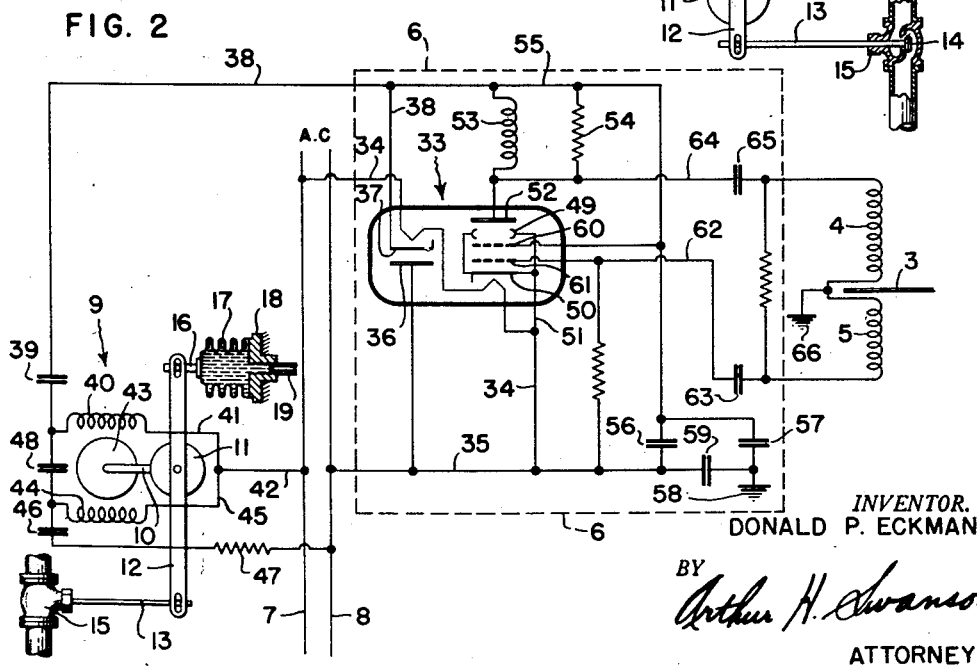
Fig. 2 is an electric circuit diagram.

Coils 4 and 5 are connected into an electric circuit mounted on a chassis or casing, generally indicated at 6, and enclosing the parts shown within the dotted lines 6 in Fig. 2. Alternating current supply lines 7 and 8 provide electricity to an oscillatory circuit contained within casing 6 and to an electric motor, generally indicated at 9, connected to said oscillatory circuit. Motor 9 should preferably have a small or zero coast or, in other words, be capable of a quick stop when the currents through the motor windings (hereinafter described) are such as not to energize the motor for rotation. Motor 9 rotates the shaft 10 connected to a speed reduction gearing 11, if a reduction in the speed of motor 9 is required. Reduction gearing 11 operates a cross arm 12 one end of which is connected to stem 13 which carries the movable element 14 of a valve having a cooperating casing 15.

For a more explicit disclosure of one type of electrically operated control system similar to that set forth herein, reference is made to application Serial Number 541,576, William H. Wannamaker, Jr., filed June 22, 1944, now Patent No. 2,514,918, issued July 11, 1950.

An oil-operated follow-up system is driven from the opposite end of arm 12 by means of a rod 16 which contacts with the movable end of a bellows 17, the interior of which bellows communicates, through its opposite or fixed end 18, with a pipe or conduit 19. Bellows 17 thus forms a pump or transmitter for the oil or other fluid with which the closed, follow-up system is filled.

The outlet end of pipe 19 communicates with a T 20 forming the stationary support for a bellows 21 which is movable by means of handle 22 supported in the yoke 23 to vary the amount of fluid in the system and thus provide a manual or automatic reset action. This automatic reset action is due to the increase or decrease of fluid in the follow-up system.

From T 20 a pipe 24 passes through the base or support 25 of a bellows 26 to whose opposite or movable end is attached an operating rod 27 having an operating pin 28 on it.

Branching off pipe 24 is a pipe 29 having a restriction in it which is manually adjustable by means of valve 300. At its opposite end, pipe 29 communicates with the interior of a bellows 30 the end of which is also attached to the operating rod 27. The opposite end of bellows 30 is stressed by a spring 31 seated against a stationary support 32.

Pin 28 bears against one side of a lever 67 which is pivotally mounted at 68. The opposite face of lever 67 bears against a ball 69 which is adjustable toward or away from the pivot 68 of lever 67 by means of a handle 70 on one end of the rod 71 which is carried in a stationary support 72. The opposite face of ball 69 bears against one face of a lever 73 which is pivoted at 74 and which carries, at its opposite or freely movable end, the pair of coils 4 and 5 of which only coil 4 is visible in Fig. 1. Spring 75 stresses lever 73, ball 69, and lever 67 against pin 28.

Referring to Fig. 2, it will be seen that there is provided a thermionic tube, generally indicated at 33, and comprising a rectifier-beam power amplifier tube, such as a well-known commercial type identified by the symbol 117L7-GT. This tube combines in one envelope a half-wave rectifier or diode section and a beam power amplifier or tetrode section. It is of the heater-cathode type designed for use directly across 117 volt alternating current supply lines.

From the supply line 7 a lead 34 connects the heater to a supply line 35 which forms a branch of the supply line 8. The plate 36 of the diode is connected to supply line 35. The cathode 37 of the diode is connected by a lead 38 through a condenser 39 to one end of field winding 40 of the motor, generally indicated at 9. The opposite end of field winding 40 is connected by wires 41 and 42 to the supply line 7. Motor 9 has a rotor 43 and a second field winding 44 which is connected at one end by wires 45 and 42 to the supply line 7. The other end of field winding 44 is connected through condenser 46 and resistor 47 to supply line 8. A condenser 48 is connected between one end of each of the field windings 40 and 44. Referring to the tetrode or beam power amplifier section of tube 33, the beam power electrodes 49 and the cathode 50 are connected by wires 51, 34 and 35 to supply line 7. The plate 52 is connected through coil 53 and resistor 54, which are in parallel, to a wire 55. One end of wire 55 is connected through lead 38 to the motor windings while the other end is connected through condenser 56, to wire 35 and through condenser 57, in parallel with condenser 56 to ground 58. The screen grid 60 is also connected to wire 35. The control grid 61 is connected by means of a wire 62 and a condenser 63 with one end of the oscillating coil 5. A wire 64 leads from the triple junction of plate 52, coil 53 and resistor 54 through a condenser 65 to one end of oscillating coil 4. The opposite ends of oscillating coils 4 and 5 are connected together and grounded at 66.

The operation of this controller is as follows: When the device is in the steady state or at rest, vane 3 occupies such a position with relation to coils 4 and 5 that the mutual inductance of these coils is at a value intermediate the maximum and minimum values of their mutual inductance. This position is exemplified by one end of vane 3 lying across the circular faces of coils 4 and 5 as a diameter. Assume that a change in the variable being measured causes measuring element 1 to move the rod 2 and consequently the vane 3 counter-clockwise as seen in Fig. 1. The vane 3 then increases its shielding action between coils 4 and 5 and therefore reduces the mutual inductance between coils 4 and 5 and consequently reduces the amount of oscillation in the circuit of which coils 4 and 5 are a part. This circuit includes the control grid 61 of the tetrode section of valve 33. This reduction in oscillation of the control grid circuit of the tetrode section increases the current which passes between the cathode 50 and the plate 52 of the tetrode section of valve 33 on the half cycles of the alternating current which pass through this tetrode section. Such an increase in the current in the plate circuit of the tetrode section of valve 33 consequently increases the current flowing through motor winding 40. On the half cycles intermediate and alternate to the half cycles just described, current passes through the diode section of tube 33 and thence through the field winding 40 of the motor 9. This diode current is substantially at the full line value. Therefore the field winding 40 receives a full wave current which is controlled by controlling the conduction of the tetrode section of tube 33, although this tetrode section only operates during a portion of the full wave current cycle. In consequence, it is possible to control the full wave current passing through the field winding 40 by regulating the conduction of the tetrode section of valve 33 which section includes the control grid 61. The motor 9 comprises the squirrel cage rotor 43 and the two field windings 40 and 44. These windings, when energized, cause the rotor 43 to rotate in one direction when the current in winding 40 exceeds the current in winding 44 and to rotate in the reverse direction when the current in the winding 40 is less than the current in the winding 44.

When the vane 3 is moved counter-clockwise, as seen in Fig. 1, and the sequence of events which have just been described, takes place, the current through motor field winding 40 is increased above the current through motor field winding 44. This causes rotor 43 to turn counter-clockwise, as seen in Fig. 1, and to turn gearing 11 and arm 12 and thus apply pressure to the oil in the transmitter pump bellows 17. This increase in oil pressure is transmitted to bellows 26. The free end of bellows 26 moves to the right as seen in Fig. 1 and moves rod 27, pin 28, lever 67, ball 69 and lever 73. This causes the coils 4 and 5 on the freely movable end of lever 73 to follow the motion of vane 3 until the coils 4 and 5 occupy their position with relation to vane 3 and therefore have the same amount of mutual induction and consequently the same degree of oscillation that they had when the control was at steady state or at rest. When the vane 3 and the coils 4 and 5 again occupy their original relative position the amount of oscillation in coils 4 and 5 is such that the currents flowing in the field windings 40 and 44 of motor 9 are equal. The motor 9 then comes almost instantaneously to a stop without any appreciable over-travel or coast. The amount of relative movement of vane 3 and coils 4 and 5, which will cause movement or stopping of motor 9, is very small being of the order of thousandths of an inch. Therefore, very small variations in the quantity, which is measured by element 1, will cause movement of the control and consequently movement of valve 14 and 15. Moreover the positions to which valve 14 and 15 can be adjusted can be very accurately determined.

The second bellows 30 and the fluid connections to it may be omitted in a simplified controller. When the bellows 30 is used, it gives reset response. This reset response or mode of operation takes place as follows. Assume that vane 3 turns counter-clockwise, as seen in Fig. 1. This changes the state of oscillation in coils 4 and is reflected through the thermionic tube 33 and its associated circuit elements mounted on the chassis 6 to the motor 9. Motor 9 is caused to rotate counter-clockwise and compress the pump or transmitter bellows 17. Pump 17 applies pressure to the liquid within it, causing an increase in pressure which is transmitted to bellows 26 causing bellows 26 to expand. The consequent movement of rod 27, pin 28, lever 67, ball 69 and lever 73 moves coils 4 carried thereby. This movement of coils 4 continues until coils 4 occupy the same relation with respect to vane 3 as before the movement of vane 3 took place. When coils 4 and vane 3 have resumed their original position relative to one another, the state of oscillation of the circuit, of which coils 4 form a part, returns to its original condition and the rotation of motor 9 ceases. However, due to the restriction provided in pipe 29 by valve 300, the pressure applied by pump or transmitter 17 to bellows 26, is not instantaneously transmitted to bellows 30. Therefore the pressure in bellows 26 is different from the pressure in bellows 30. Thus, the increased pressure in bellows 26, referred to above, and the resulting movement of rod 27, compresses spring 31. As soon as rod 27 moves out of its initial position in which the pressures in bellows 26 and in bellows 30 are balanced, the reset action commences as a flow through the pipe 29 and the valve 300 from the bellows in which the pressure is high (in the assumed case, bellows 26) to the bellows in which the pressure is low. This flow causes the rod 27 and, consequently the coils 4, to re-assume their initial, intermediate position in which the pressures in the bellows 26 and 30 are balanced. The condition governed by the valve 14—15 is intended to affect the measuring element 1, so that the measuring element 1 returns the vane 3 to its initial, intermediate position. Thus the reset response or mode of operation causes the measuring element 1 to tend to be maintained at its preselected set point regardless of the load imposed upon the industrial process controlled by valve 14—15 and measured by element 1.

Throttling range of proportional band adjustment is accomplished by the parallel, pivotally mounted levers 67 and 73 and the manual adjustment of the ball 69 between these levers.

When the change in the variable being measured by meter 1 is opposite to that just described, the vane 3 is turned clockwise as seen in Fig. 1 and the sequence of events is reversed.

In the steady state or normal balanced condition of the variable affecting the measuring element 1, to which steady state or position of vane 3 the follow-up system just described tends to cause the controller to return, the vane 3 occupies a position proportional to the adjusted position of valve 14 and 15. The position of vane 3 relative to coils 4 and 5 is such that the opposing torques imposed on the rotor 43 of the motor 9 by the winding 40 and 44 are equal and opposite. Therefore the rotor 43 is then stationary.

While in accordance with the provisions of the statutes, I have illustrated and described the best forms of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention what I claim as new and desire to secure with Letters Patent is:

1. A controller for positioning a final control element in response to changes in a control variable as sensed by a measuring element, said controller including, an electric motor connected to a source of electricity, an oscillatory circuit having control of said motor so as to energize said motor for movement in one direction or the other upon a change of state of oscillation of said circuit, a pair of oscillating coils mounted for mechanical movement and connected into said oscillatory circuit, a shielding vane mounted for movement relative to said oscillating coils so as to vary the state of oscillation in said coils, a mechanical connection between said vane and the measuring element so that said vane is moved proportionally to the changes of the control variable, and a closed liquid-operated system including a liquid pump operated by said electric motor, a first liquid-operated bellows movable in response to the pressure from said pump, a second liquid-operated bellows movable in the opposite direction to said first bellows in response to liquid pressure from said pump, a spring biasing said first and second bellows in the direction of movement of said second bellows, a restricted conduit for liquid between said pump and said second bellows, a manually operable valve controlling the amount of said restriction, a variable speed mechanism forming the driving connection from the said first and said second bellows for mechanically moving said oscillating coils, a handle for manually varying the ratio between the input speed and the output speed of said driving connection, a third bellows for varying the liquid pressure in said liquid system, and a handle for actuating said third bellows.

2. A controller for positioning a final control element in response to changes in a control variable as sensed by a measuring element, said controller including, an electric motor energized by a source of electricity, an oscillatory circuit having control of said motor so as to vary the energization of said motor for movement in one direction or the other upon a change of state of oscillation of said circuit, a first relatively movable element comprising a pair of oscillating coils connected into said oscillatory circuit, a second relatively movable element comprising a shielding vane mounted so that relative movement between said vane and said oscillating coils varies the state of oscillation in said coils, a mechanical connection driven by the measuring element and connected to one of said relatively movable elements so that the relative movement between said oscillating coils and said vane is proportional to the changes of the control variable, a closed liquid-operated device driven by said electric motor and forming a follow-up driving connection from said motor to one of said relatively movable elements, and a handle for manually varying the output speed of said driving connection.

3. A controller for positioning a final control element in response to changes in a control variable as received by a measuring element, said controller including, an electric motor connected to a source of electricity, an oscillatory circuit having control of said motor so as to energize said motor for movement in one direction or the other upon a change of state of oscillation of said circuit, a first relatively movable element comprising a pair of oscillating coils connected into said oscillatory circuit, a second relatively movable element comprising a shielding vane mounted so that relative movement between said vane and said oscillating coils varies the state of oscillation in said coils, a mechanical connection driven by the measuring element and connected to one of said relatively movable elements so that the relative movement between said oscillating coils and said vane is proportional to the changes of the control variable, a closed liquid-operated device driven by said electric motor, and a variable speed mechanism forming a follow-up driving connection from said motor to one of said relatively movable elements, a bellows for varying the pressure in said liquid system, and a handle for actuating said bellows.

4. A controller for positioning a final control element in response to changes in a control variable as sensed by a measuring element, said controller including, an electric motor connected to a source of electricity, an oscillatory circuit having control of said motor so as to energize said motor for movement in one direction or the other upon a change of state of oscillation of said circuit, a first relatively movable element compris- ing a pair of oscillating coils connected into said oscillatory circuit, a second relatively movable element comprising a shielding vane mounted so that relative movement between said vane and said oscillating coils varies the state of oscillation in said coils, a mechanical connection driven by the measuring element and connected to one of said relatively movable elements so that the relative movement between said oscillating coils and said vane is proportional to the changes of the control variable, and a closed liquid-operated device including a liquid pump operated by said electric motor, a liquid-operated bellows movable in response to the pressure in said pump, and a variable speed mechanism forming a follow-up driving connection from said bellows to one of said relatively movable elements.

5. A controller for positioning a final control element in response to changes in a control variable as measured by a measuring element, said controller including, an electric motor connected to a source of electricity, an oscillatory circuit having control of said motor so as to energize said motor in either of two opposite directions upon a change of state of oscillation of said circuit, a first relatively movable element comprising a pair of oscillating coils connected into said oscillatory circuit, a second relatively movable element comprising a shielding vane mounted so that relative movement between said vane and said oscillating coils varies the state of oscillation in said coils, a mechanical connection driven by the measuring element and connected to one of said relatively movable elements so that the relative movement between said oscillating coils and said vane is proportional to the changes of the control variable, and a closed liquid-operated device including a liquid pump operated by said electric motor, a first liquid-operated bellows movable in response to the pressure in said pump, a second liquid-operated bellows movable in the opposite direction to first liquid-operated bellows in response to liquid pressure from said pump, a restricted conduit for liquid between said pump and said second bellows, and a variable speed mechanism forming a follow-up driving connection from the said first and said second bellows to one of said relatively movable elements.

6. A controller for positioning a final control element in response to changes in a control variable as measured by a measuring element, said controller including, an electric motor energized from a source of electricity, an oscillatory circuit having control of said motor so as to vary the energization of said motor and to cause movement of said motor in one direction or the other upon a change of state of oscillation of said circuit, a first relatively movable element comprising a pair of oscillating coils connected into said oscillatory circuit, a second relatively movable element comprising a shielding vane mounted so that relative movement between said vane and said oscillating coils varies the state of oscillation in said coils, a mechanical connection driven by the measuring element and connected to one of said relatively movable elements so that the relative movement between said oscillating coils and said vane is proportional to the changes of the control variable, and a closed liquid-operated device including a liquid pump operated by said electric motor, a first liquid-operated bellows movable in response to the pressure in said pump, a second liquid-operated bellows movable in the opposite direction to first liquid-operated bellows in response to liquid pressure from said pump, a spring biasing said first and second bellows in the direction of movement of said second bellows, a restricted conduit for liquid between said pump and said second bellows, and a variable speed mechanism forming the follow-up driving connection from the said first and said second bellows to one of said relatively movable elements.

7. A final control element operating system responsive to the movements of a measuring element, including, an electrically operated circuit including a coil whose inductance is varied by the movements of said measuring element, an electric motor connected to a source of electricity and movable under the control of said electrically operated circuit so as to move said final control element in one direction or the other, a closed liquid-operated circuit driven by said motor, and a device having a variable output speed driven by said liquid-operated system and driving said coil to a preselected position with relation to said measuring element.

8. A simple, sensitive and accurate controller having a freely movable measuring element and a final control element accurately following the movements of said measuring element, including, an electrically operated proportional control system having a coil movably mounted adjacent said measuring element so that the inductance of the coil is varied by the movements of the measuring element, an electric motor connected to a source of power and driving the final control element in response to the movements of the measuring element, a closed liquid-operated follow-up system having a pump driven by said motor, a bellows driven by the liquid moved by said pump, a mechanism having a variable output speed and driven by said bellows, and a manually operable handle for varying the output speed of said mechanism, said coil being connected so as to be driven by said mechanism into a selected predetermined position with relation to said measuring element.

DONALD P. ECKMAN.

REFERENCES CITED

The following references are of record in the file of this patent:

UNITED STATES PATENTS

| Number | Name | Date |
|---|---|---|
| 1,838,084 | Drake | Dec. 29, 1931 |
| 2,208,559 | Baak | July 23, 1940 |
| 2,414,314 | Machlet | Jan. 14, 1947 |